(12) United States Patent
Hoffmann

(10) Patent No.: US 8,561,493 B2
(45) Date of Patent: Oct. 22, 2013

(54) AUTOMATED MULTI-GROUP TRANSMISSION OF A MOTOR VEHICLE AND METHOD FOR OPERATING AN AUTOMATED MULTI-GROUP TRANSMISSION

(75) Inventor: Rayk Hoffmann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 76 days.

(21) Appl. No.: 13/132,870

(22) PCT Filed: Oct. 15, 2009

(86) PCT No.: PCT/EP2009/063452
§ 371 (c)(1),
(2), (4) Date: Jul. 5, 2011

(87) PCT Pub. No.: WO2010/066489
PCT Pub. Date: Jun. 17, 2010

(65) Prior Publication Data
US 2011/0259147 A1    Oct. 27, 2011

(30) Foreign Application Priority Data
Dec. 10, 2008 (DE) .......................... 10 2008 054 477

(51) Int. Cl.
*F16H 3/08* (2006.01)

(52) U.S. Cl.
USPC ........................................... 74/330

(58) Field of Classification Search
USPC .................... 74/330, 331, 333, 340
See application file for complete search history.

(56) References Cited

U.S. PATENT DOCUMENTS

| 6,766,705 B1 * | 7/2004 | Hall, III ........................... 74/331 |
| 7,077,024 B2 * | 7/2006 | Lauri et al. ..................... 74/325 |
| 8,066,606 B2 * | 11/2011 | Dittrich et al. ................ 475/218 |
| 8,146,451 B2 * | 4/2012 | Van Druten et al. ............ 74/330 |
| 2008/0134834 A1 | 6/2008 | Gitt et al. |
| 2008/0254932 A1 | 10/2008 | Heinzelmann |
| 2009/0107289 A1 | 4/2009 | Borntrager |

FOREIGN PATENT DOCUMENTS

| DE | 10 2005 046 894 A1 | 5/2007 |
| DE | 10 2006 024 370 A1 | 12/2007 |
| DE | 10 2008 001 200 A1 | 10/2009 |

(Continued)

OTHER PUBLICATIONS

International Search Report issued in international application No. PCT/EP2009/063452, mailed Jan. 18, 2010 (2 pages).
International Written Opinion issued in international application No. PCT/EP2009/063452, mailed Jan. 18, 2010 (8 pages).

(Continued)

*Primary Examiner* — Ha D Ho
(74) *Attorney, Agent, or Firm* — Brinks Hofer Gilson & Lione

(57) ABSTRACT

An automated multi-group transmission of a motor vehicle comprises at least two gearing groups successively disposed in a power flow of a drive train, a clutch assembly having at least one start-up clutch, by which a connection can be established between a drive shaft of a drive motor and a transmission input shaft associated with a first gearing group, a shifting device, by which a connection can be established between the transmission input shaft and a transmission main shaft associated with a second gearing group, whereby the transmission main shaft is designed as a transmission output shaft or is at least functionally connected to a transmission output shaft, and a structure by which the tractive force gear shifting can be carried out.

20 Claims, 5 Drawing Sheets

(56) References Cited

FOREIGN PATENT DOCUMENTS

Figure 1:
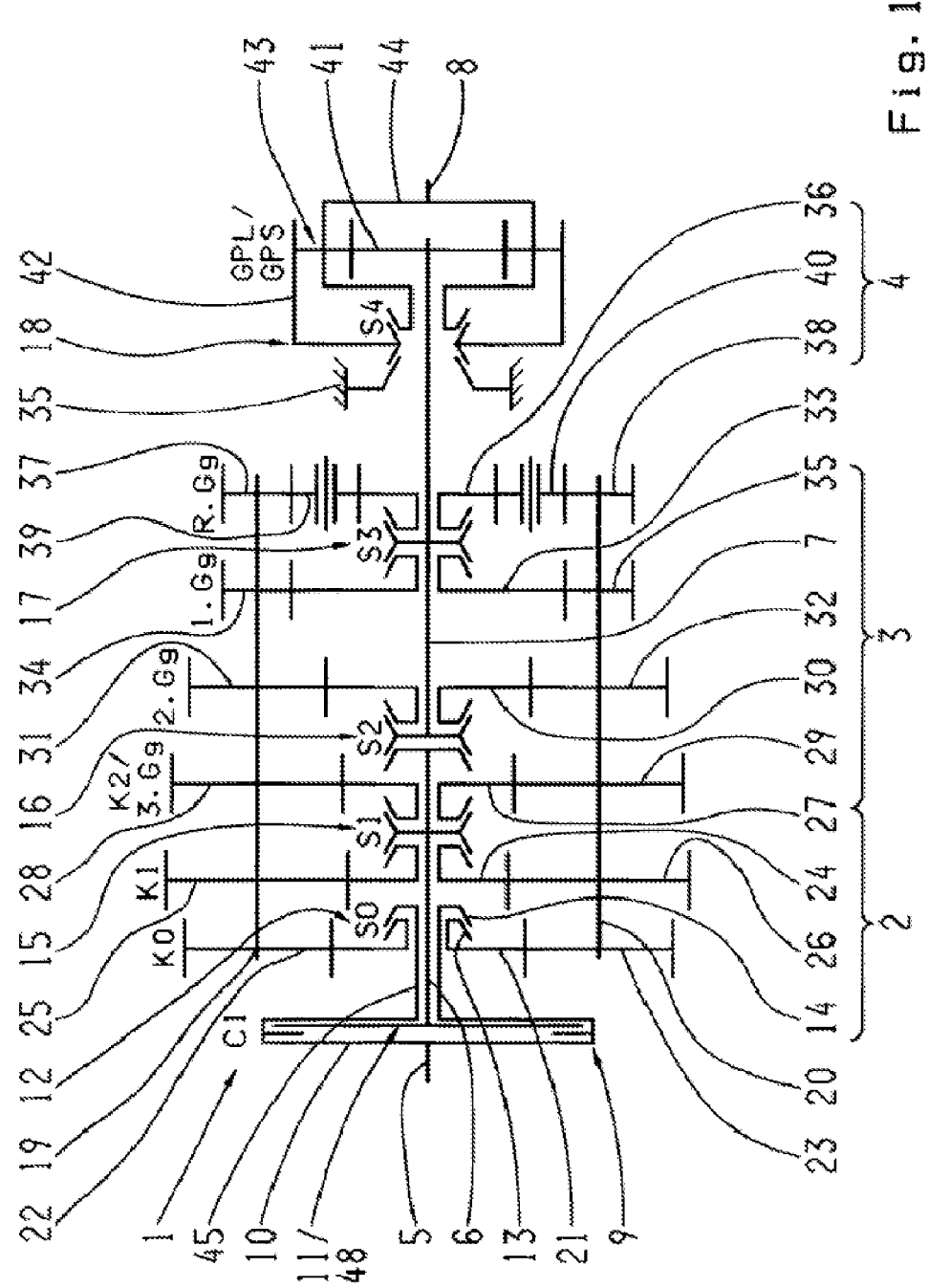

| WO | 95/27158 A1 | 10/1995 |
|----|-------------|---------|
| WO | 2007/009594 A1 | 1/2007 |
| WO | 2007/115687 A1 | 10/2007 |
| WO | 2009/127473 A1 | 10/2009 |

OTHER PUBLICATIONS

International Preliminary Report on Patentability issued in international application No. PCT/EP2009/063452, dated Feb. 7, 2011 (11 pages).

U.S. Appl. No. 13/105,639, filed May 11, 2011, entitled "Split Axis Transmission Architecture" (47 pages).

* cited by examiner

| Gear | C1 | Syn 0 | | Syn 1 | | | Syn 2 | | | Syn 3 | | | Syn 4 | | Remarks |
|---|---|---|---|---|---|---|---|---|---|---|---|---|---|---|---|
| | | K0 | N | K1 | N | K2 | C1 | N | 2.6g | 1.6g | N | R.Ga | L | H | |
| 1 | X | X | O | X | O | | | O | | | | | X | | |
| 2 | X | X | O | | O | X | | O | | X | | | X | | |
| 3 | X | X | O | | O | X | | O | | X | | | X | | |
| 4 | X | X | O | X | O | | | O | X | | | | X | | |
| 5 | X | X | O | X | O | | | O | X | | | | X | | |
| 6 | X | X | O | | O | X | | O | X | | | | X | | |
| 7 | X | X | O | X | O | | X | | | X | | | X | | |
| 8 | X | X | O | X | O | | X | | | X | | | X | | |
| (9) | X | X | O | | O | X | X | | | | | | X | | not practical |
| 10 | X | X | O | X | O | | | O | | | X | O | | X | |
| 11 | X | X | O | | O | X | | O | | X | | O | | X | |
| 12 | X | X | O | | O | X | | O | | X | | O | | X | |
| 13 | X | X | O | X | O | | | O | X | | | O | | X | |
| 14 | X | X | O | X | O | | | O | X | | | O | | X | |
| 15 | X | X | O | | O | X | | O | X | | | O | | X | |
| 16 | X | X | O | X | O | | X | | | | | O | | X | |
| 17 | X | X | O | X | O | | X | | | | | O | X | | DD |
| 18 | X | X | O | X | O | | X | | | | | O | | X | OD |
| R1 | X | X | O | X | O | | | O | | | | | X | | |
| R2 | X | X | O | X | O | | | O | | | X | | X | | |
| (R3) | X | X | O | | O | X | | O | | | | X | | X | not practical |
| (R4) | X | X | O | X | O | | | O | | | | X | | X | not practical |
| (R5) | X | X | O | X | O | | | O | | | | X | | X | not practical |
| (R6) | X | X | O | | O | X | | O | | | | X | | X | not practical |

Fig. 2

| Gear | C1 | C2 | Syn 1 |  |  | Syn 2 |  |  |  | Syn 3 |  | Syn 4 |  | Remarks |
|---|---|---|---|---|---|---|---|---|---|---|---|---|---|---|
|  |  |  | K1 | N | K2 | C1 | N | 2.Gg | 1.Gg | N | R.Gg | L | H |  |
| 1 | X |  | X |  |  |  | O |  |  |  |  | X |  |  |
| 2 |  | X |  | O |  |  | O |  |  |  |  | X |  |  |
| 3 | X |  |  | O | X |  | O |  | X |  |  | X |  |  |
| 4 | X |  | X |  |  |  |  | X |  | O |  | X |  |  |
| 5 |  | X |  | O |  |  |  | X |  | O |  | X |  |  |
| 6 | X |  |  | O | X |  |  |  | X | O |  | X |  |  |
| 7 |  | X |  | O | X | X |  |  |  | O |  | X |  |  |
| 8 | X |  | X |  |  | X |  |  |  | O |  | X |  |  |
| (9) | X |  | X |  |  | X |  |  |  | O |  |  |  | not practical |
| 10 |  | X |  | O |  |  |  | X | X |  |  |  | X |  |
| 11 | X |  |  | O | X |  |  | X | X | O |  |  | X |  |
| 12 |  | X |  | O |  |  |  | X |  | O |  |  | X |  |
| 13 | X |  | X |  |  |  |  | X |  | O |  |  | X |  |
| 14 |  | X |  | O |  | X |  |  |  | O |  |  | X |  |
| 15 | X |  |  | O | X | X |  |  |  | O |  |  | X |  |
| 16 |  | X |  | O |  | X |  |  |  | O |  |  | X | DD |
| 17 | X |  | X |  |  |  |  |  |  | O |  |  | X | OD |
| 18 |  | X |  | O |  |  |  |  |  | O |  |  | X |  |
| R1 | X |  | X |  |  |  |  |  |  |  | X | X |  |  |
| R2 | X |  |  |  | X |  |  |  |  |  | X | X |  |  |
| (R3) |  | X |  | O |  |  |  |  |  |  | X |  | X | not practical |
| (R4) | X |  | X |  |  |  | O |  |  |  | X |  | X | not practical |
| (R5) | X |  |  |  | X |  | O |  |  |  | X |  | X | not practical |
| (R6) |  | X |  |  |  |  | O |  |  |  | X |  | X | not practical |

Fig. 5

AUTOMATED MULTI-GROUP TRANSMISSION OF A MOTOR VEHICLE AND METHOD FOR OPERATING AN AUTOMATED MULTI-GROUP TRANSMISSION

This application is a filing under 35 U.S.C. §371 of International Patent Application PCT/EP2009/063452, filed Oct. 15, 2009, which claims priority to German Application No. 10 2008 054 477.9, filed Dec. 10, 2008, each of which is hereby incorporated by reference herein in its entirety.

The invention relates to an automated multi-group transmission of a motor vehicle and a method for operating an automated multi-group transmission of this type according to the preamble of patent claim 1, or respectively, the preamble of patent claim 11.

Multi-group transmissions consist of two or more, for the most part, serially disposed gearings, by means of the combination of which a high number of gear ratios can be obtained. Increasingly they are conceived as automatic transmissions, consisting, for example, of an input group, a main group, and a rear-mounted, range-change group. Transmissions of this type are used in particular in utility vehicles, as they allow for a large number of gears with a small gear stepping and a high degree of efficiency. In addition, they distinguish themselves, in comparison to manual transmissions, by a high degree of operational comfort without the danger of operational errors, and in comparison to conventional automatic transmissions are particularly economical regarding production and operating costs.

Depending on the design, conventional multi-group transmissions, as with all manual or automatic transmissions that are shifted when not subjected to load, are subject to an interruption of the tractive force when shifting gears, because the power flow from the drive motor is interrupted through the disengagement of a clutch, in order to disengage the engaged gear while it is not subjected to load, by means of engine control, transmission brake and/or synchronization, in a neutral setting, to synchronize the transmission and the drive motor to a subsequent rotational speed of a selected or prescribed target gear and to engage the target gear. Limitations occur, as a result of the interruption of the tractive force, regarding the driving performance due to a loss of speed as well an increase in fuel consumption. While tractive force interruptions in passenger vehicles are normally only disturbing as a result of losses to the driving dynamics, for example in a more sports-like oriented driving style, with heavier utility vehicles this can slow the vehicle on inclines in such a manner that it is impossible to upshift, resulting in undesired downshifting, creeping or even additional start-up procedures.

The layout design of the step changes of the transmission is determined by the maximal torque of the internal combustion engine and the number of transmission ratio steps as a matter of principle. The power to weight ratio of the vehicle is decisive, however, regarding drivability in the individual gear steps and shifting frequency. Accordingly, the operating points of the internal combustion engine are determined for a specific total weight of the vehicle. Because utility vehicles frequently, however, are not working at full capacity in long-distance traffic, i.e. are only partially loaded, or unloaded, or are driven for long distances over very even routes, the internal combustion engine is often operated with a clear power excess, for which the determination of the operating points for a specific vehicle total weight is responsible. This in turn unnecessarily increases the fuel consumption.

A reduction of the undesired power excesses of this type is possible by means of a transmission layout with a comparably very small rear axle transmission ratio. In practice it has been shown however that with a transmission conceived in this manner a significantly higher shifting frequency occurs. This may seem very uncomfortable for the driver due to the thereby associated frequent tractive force interruptions. With a vehicle operation where the vehicle is fully loaded, in which the overdrive is less likely to be used and a transmission stepping with a comparatively very fast rear axle transmission ratio then seems less practical, the occurring tractive force interruptions may even be regarded as unacceptable.

The applicant has already proposed a series of solutions for automatic multi-gear transmissions which reduce or entirely eliminate tractive force interruptions of this type. In particular, DE 10 2006 024 370 A1, DE 10 2005 046 894 A1 and the unpublished DE 10 2008 001 200 are specified. The tractive force support is basically based on the fact that the design of a group transmission allows for the engaging of a direct gear as an intermediate gear during a shifting. In addition, a temporary direct connection of an input shaft with an output shaft is established by means of a power-shift clutch, whereby a dog clutch shifted main gearing is left unloaded, such that with an engaged start-up clutch the engaged original gear is disengaged in an unloaded state, the transmission is synchronized and a target gear can be engaged. The power-shift clutch transfers thereby an engine torque to the transmission output, whereby a released dynamic torque during a rotational rate reduction between the original gear and the target gear is utilized to compensate to a large degree for the decrease in tractive force.

The power-shift clutch can for example, as DE 10 2006 024 370 A1 shows, be disposed between a speed input gearing and a three speed main gearing or between a start-up clutch and the input gearing. In DE 10 2005 046 894 A1 a power-shift clutch is deployed in a range gearing downstream of the main gearing. DE 10 2008 001 200 proposes a double clutch assembly featuring a start-up clutch for connecting a drive shaft with a transmission input shaft and a power-shift clutch for a direct connection of the drive shaft with an output drive side transmission main shaft, whereby the double clutch can preferably be actuated through a common actuator device, which can selectively engage or disengage one or the other of the two clutches, or both clutches.

Furthermore, from WO 2007/009 594 A1 an automated multi-group transmission with a countershaft transmission design, designed as a double clutch transmission, is known. The multi-group transmission comprises a splitter gearing having a downstream main gearing and if applicable a range gearing. All indirect forward gears run in the power flow over the same countershaft. A direct gear can alternatively run in the power flow over another power path. As a result, a power shift-ability occurs for one group from gears neighboring the direct gear within the main gearing. It is possible, by means of the double clutch, to control, depending on the gear shifting, a selected forward gear power path and the direct gear power path, the two of which overlap. The one clutch controls one power path and the other clutch controls the other power path. If the one clutch is engaged and the other clutch is disengaged, it is then possible to shift two gears in the main gearing simultaneously. With the temporal overlap during the gear shifting, a decreasing portion of the transmission input power flows over the one power path while an increasing portion of the transmission input power flows over the other power path. The gear shifting can thereby occur while loaded. The power shift-ability of the known transmission is based on the deployment of a double clutch.

With this background information, the invention has the objective of further improving the known multi-group transmissions with power shiftable gears and the known method for operating such transmissions and to make more adaptable, in particular in order to achieve a power shift-ability that does not require the deployment of a double clutch and/or an intermediate gear shift-ability.

The solution for this objective may be derived from the characteristics of the independent claims, while advantageous embodiments and developments of the invention may be derived from the respective associated dependent claims.

The invention realizes that with a synchronized shiftable additional input constant independent of the shifting state of a start-up clutch, which can be activated directly by a drive motor by bypassing the start-up clutch, a number of gear shiftings, which can be shifted while loaded, can be made possible with an automatic transmission.

Accordingly, the invention is based on an automated multi-group transmission of a motor vehicle with at least two gearing groups disposed successively in the power flow of a drive train, with a clutch assembly which has at least one start-up clutch, by means of which a connection can be established between an output shaft of a drive motor and a transmission input shaft associated with a first gearing group, with a shifting device by means of which a connection can be established between the transmission input shaft and a transmission main shaft associated with a second gearing group, whereby the transmission main shaft is designed as a transmission output shaft or at least is functionally connected to a transmission output shaft, and with a means by which tractive force supported gear shiftings can be executed. To achieve the proposed objective the invention also assumes that the first gearing group is designed as a splitter gearing with at least three input constants, whereby a first motor side input constant can be shifted by means of a power-shift clutch which bypasses the start-up clutch.

The disposition according to the invention is applicable to particular advantage with a multi-group transmission, in particular for freight vehicles, busses or special purpose vehicles with which three gearing groups with automatic transmission control are disposed successively in the power flow, whereby the first gearing group is designed as an, at least, three-stage splitter gearing, the second gearing group is designed as a multi-speed main gearing and the third gearing group is designed as a two-stage range gearing. The splitter gearing and the main gearing can be designed as a gear train assembly in a space saving countershaft type design.

For this the torque flow is guided preferably in a parallel manner over two countershafts collectively associated with the splitter gearing and the main gearing, whereby a balanced load distribution to the shafts and the gearwheels results. The downstream range gearing can be designed as a planetary structure with, for example, an inner sun gear, a planetary gear set guided by a planet carrier and an outer ring gear.

With a transmission configuration providing a particularly high number of gear ratios with a corresponding small gear stepping, as is advantageous for heavy trucks, a three-stage main gearing with a reverse gear may be provided. From the combination of three splitter gear ratios, three main gearing gear ratios and two range gearing gear ratios there are then eighteen forward gears and up to six reverse gears, of which seventeen forward gears and two reverse gears can be reasonably usable. In this configuration, the second highest gear, the 17th gear, for example can be designed as a direct gear with the transmission ratio of $i=1:1$ and the highest gear, the 18th gear, can be designed as an overdrive gear with a particularly fast transmission ratio $i<1$.

In this manner, there is, on the one hand, a—not necessarily power-shiftable—"super-fast gear" (18th) for a minimally loaded vehicle, for example a truck which is driven on an unloaded drive on a highway, in order to decrease the power excesses to the internal combustion engine and thereby to provide a reduction of fuel consumption. On the other hand, it is advantageous to have a tractive force maintaining power-shift in the relevant gears, enabling, for example, tractive upshifting to a direct gear and tractive downshifting from a direct gear, for the fully loaded vehicle, by means of which increased driving comfort is ensured.

All three transmission groups are preferably synchronized, i.e. they are provided with a synchromesh clutch having the appropriate synchronization means in the form of a shifting device, whereby according to the invention a supplementary motor side input constant can be shifted by means of a power-shift clutch.

The power-shift clutch may be designed in a first, particularly advantageous embodiment of the invention, as a synchromesh clutch as well. The synchromesh clutch is however functionally connected directly to the drive motor by means of a crankshaft bypass, such that the first input constant can be operated independently of the shifting state. Accordingly, all gears in which the first input constant is activated are operated through the power-shift clutch. All other gears are operated through the start-up clutch.

A particularly compact construction of a transmission configuration with a comparably small overall axial length is advantageously obtained in that the synchromesh clutch is located between the first and a second input constant, and the synchromesh clutch has a first shift element which passes through the transmission input shaft by means of a hollow shaft, which is connected to an input component of the clutch assembly connected to the drive shaft, and a second shift element which works together with the first shift element, connected to the first input constant by means of an idle gear rotationally mounted on the hollow shaft.

In a first embodiment of the invention, the power-shift clutch can be designed as a friction clutch upstream of the first input constant. The power-shift clutch can then, based on known double clutch transmissions, form a double clutch with a common input component connected to the drive shaft by means of a start-up clutch which is also designed as a friction clutch, whereby with the double clutch according to the invention, an output component of the start-up clutch is connected to the transmission input shaft, and an output component of the power-shift clutch is connected to an idle gear of the first input constant rotationally mounted on the transmission input shaft.

Furthermore, the invention provides a method for operating an automated multi-group transmission of a motor vehicle with at least two transmission groups successively disposed in the power flow of a drive train, with a clutch assembly which has at least one start-up clutch, by means of which a connection can be established between a first drive shaft of a drive motor and a transmission input shaft associated with a first gearing group, with a shifting device, by means of which a connection can be established between the transmission input shaft and a transmission main shaft associated with a second gearing group, whereby the transmission main shaft is designed as a transmission output shaft or is at least functionally connected to a transmission output shaft, and with a means, by which the tractive force supported gear shifting can be executed. The invention intends as a means of attaining the objective presented above, that with a tractive force supported gear shifting, depending on whether it is upshifting or downshifting, the start-up clutch is engaged or disengaged, while mutually overlapping a power-shift which bypasses the start-up clutch, by means of which a motor side input constant of the first transmission group is shifted, disengaged, or engaged.

In particular it may be provided that to execute a tractive force supported gear shifting with a transmission having a three-stage splitter gearing, a three-stage main gearing and a two-stage range gearing, the power-shift clutch for shifting the first input constant alternates between a disengaged setting and an engaged setting, the start-up clutch alternates in slippage mode between a disengaged setting and an engaged setting, a shifting device for shifting a second and a third input constant alternates between a shifting setting and a neutral setting, the shifting device for establishing a connection of the transmission input shaft with the transmission main shaft remains in an unaltered shifting setting, a shifting device for shifting a 1st gear and a reverse gear of the main gearing remains in an unaltered shifting setting, and a shifting device for range shifting of the range gearing remains in an unaltered shifting setting.

Furthermore, it may be provided that for shifting the non-direct forward gears a power flow connection is established between the drive shaft and the transmission main shaft, which runs over at least one countershaft, while for shifting a direct gear, on the one hand, the transmission input shaft and the output side transmission main shaft are directly connected by means of the associated shifting device, and on the other hand, the transmission input shaft and the drive shaft of the drive motor are connected to one another by means of the start-up clutch.

A power-shiftable upshifting procedure with this embodiment is then carried out with a synchromesh clutch as the power-shift clutch consistently from one gear, with which the supplementary input constant is shifted, thereby engaging the synchromesh clutch and bypassing the start-up clutch. The start-up clutch is engaged in slippage mode during gear shifting, while the power-shift clutch is disengaged. Furthermore, the synchromesh clutch is shifted between the middle and third input constants. All other synchromesh clutches remain unaltered in their shifting settings.

A downshifting procedure can logically be carried out in the reverse order. With an additional friction clutch as the power-shift clutch, however, it is possible for the start-up clutch or the power-shift clutch to be engaged at the beginning, thus resulting in further power-shiftable gear shifting possibilities.

Figure 3A:
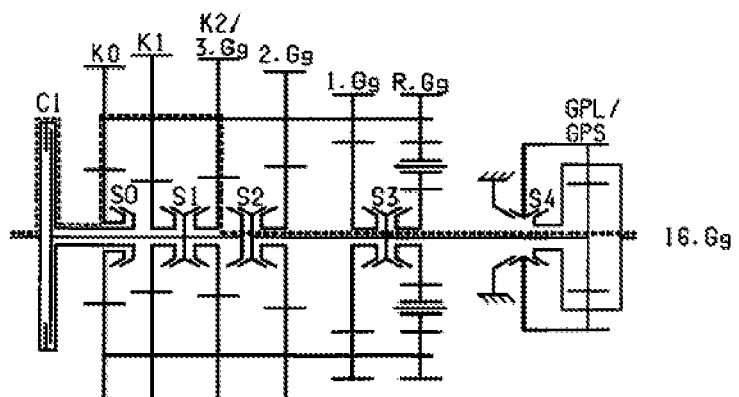
Figure 3B:
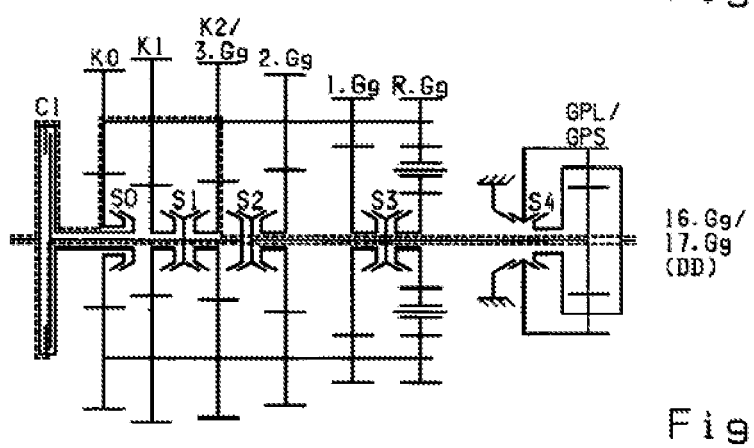
Figure 3C:
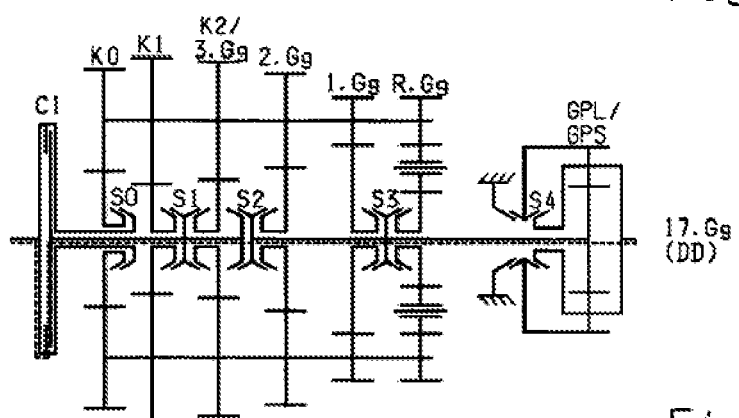
Figure 4:
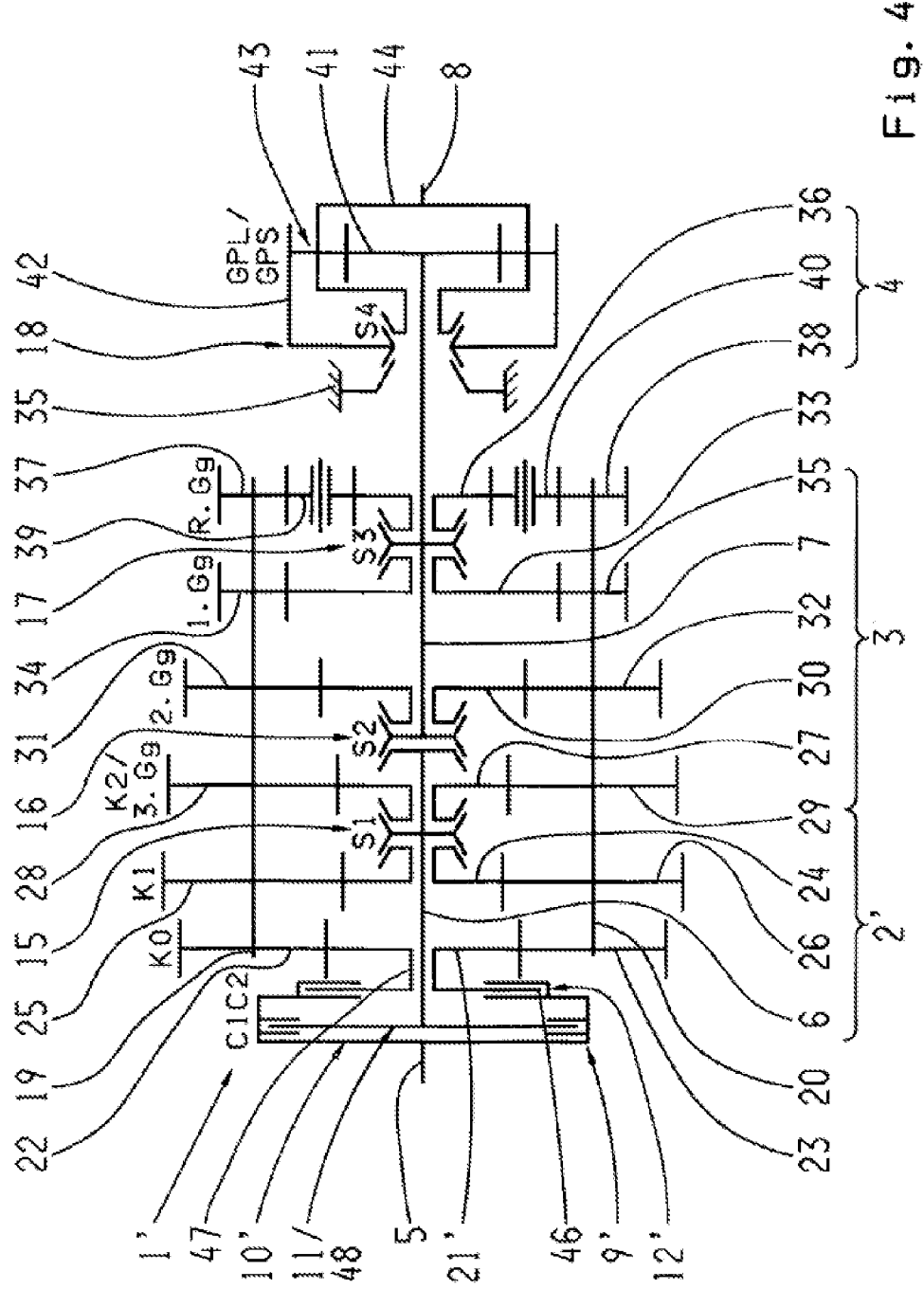

To illustrate the invention, drawings of two embodiments accompany the description. They show:

FIG. 1 A gear pattern of a multi-group transmission of a motor vehicle with a power-shift clutch for a tractive force supported gear shifting, FIG. 2 A gear shifting table for the transmission of FIG. 1, FIG. 3a The torque flow of the transmission in FIG. 1 in a 16th gear, FIG. 3b The torque flow of the transmission in FIG. 1 during a gear shifting from the 16th gear to a 17th gear in the form of a direct gear, FIG. 3c The torque flow of the transmission in FIG. 1 in the 17th gear, FIG. 4 A second embodiment of a gear pattern of a multi-group transmission of a motor vehicle with a power-shift clutch for tractive force supported gear shifting, and FIG. 5 A gear shifting table for the transmission of FIG. 4.

Accordingly, FIG. 1 shows a countershaft transmission 1 as it can be intended for a multi-group transmission, for example for a drive train of a long distance truck. The gear set concept according to the invention is essentially based on the known ZF-AS Tronic series of the applicant, with two parallel rotationally mounted countershafts 19, 20 and three successively disposed gearing groups 2, 3, and 4.

A first, motor side gearing group 2 is designed as a splitter gearing, which, according to the invention—instead of the usual two—but rather, has three input constants K0, K1, K2. A second, middle gearing group 3 is designed as—unlike the usual dog clutch—but rather, a synchronized main gearing with three forward gears and a reverse gear, whereby a 3rd gear and the third input constant K2 form a combined gear set. A third, output drive side gearing group 4 is designed as a planetary gear assembly GPL/GPS, which can be shifted between two gear ranges.

The three input constants K0, K1, K2 in each case have a fixed gear 22, 25, 28 on the one countershaft 19 and one fixed gear 23, 26, 29 on the other countershaft 20. The fixed gear pairs 22-23, 25-26, 28-29 formed thereby mesh with a respective idle gear 21, 24, 27. The middle input constant K1 and the third, innermost input constant K2 are shiftable by means of a shifting device 15, designed as a synchromesh clutch S1 with two shift settings and a neutral setting. The synchromesh clutch S1 sits with the normal sliding synchronizing and shifting elements on a transmission input shaft 6, such that in a first shifting setting the idle gear 24 of the middle input constant K1 and in a second shifting setting the idle gear 27 of the third input constant K2 can be connected in a fixed manner with the transmission input shaft 6. The neutral setting is disposed between the two.

The supplementary, outer input constant K0 has, according to the invention, a power-shift clutch 12, designed as a synchromesh clutch S0 with a shifting setting and a neutral setting. The synchromesh clutch S0 has a first shift element 14, which is connected in a fixed manner, by means of a hollow shaft 45, with an input component 10 of a clutch assembly 9. The idle gear 21 of the input constant K0 is rotationally mounted on the hollow shaft 45. The transmission input shaft 6 passes concentrically through the hollow shaft 45 and is connected on its motor side end with an output component 48 to a start-up clutch 11 of the clutch assembly 9, designed as a friction clutch C1. The input component 10 of the clutch assembly 9 is connected in turn to a drive shaft 5, in particular a crankshaft, of a drive motor (not shown), in particular an internal combustion engine. A second shift element 13 corresponding to the first shift element 14 is connected to the idle gear 21 such that the synchromesh clutch S0 connects the idle gear 21 with the drive shaft 5 in a force locking manner in one shift setting, i.e. a crankshaft bypass of the clutch assembly 9 to the input constant K0 is obtained, and otherwise assumes a neutral setting.

Between the splitter gearing 2 and the main gearing 3 located behind said is another shifting device 16 designed as a synchromesh clutch S2. In a first shift setting the drive side transmission input shaft 6 can be connected to the output side transmission main shaft 7 assigned to the main gearing 3 by means of this synchromesh clutch S2. In a second shift setting the transmission main shaft 7 can be connected to an idle gear 30 of a second main gearing gear in a rotationally fixed manner. Furthermore, a neutral setting is provided. However, no connection can be established by means of the synchromesh clutch S2 between the idle gear 27 of the inner input constant K2 and the transmission main shaft 7. The synchromesh clutch S2 is therefore, according to the invention, fully decoupled from the neighboring third input constant K2.

The main gearing 3 has three forward gears, 1.Gg, 2.Gg, 3.Gg as well as a reverse gear R.Gg. The 1st gear and the 2nd gear comprise respectively two fixed gears 34, 35, respectively, 31, 32 and an idle gear 33, respectively 30. The 3rd gear is obtained with the third input constant K2 of the splitter gearing 2.

The reverse gear R.Gg comprises two fixed gears 37, 38, an idle gear 36 and two rotationally mounted intermediate gears 39, 40 which, for the reversal of the rotation direction, mesh on the one hand with the respective fixed gear 37 or 38, and on the other hand, with the idle gear 36. To shift to the 1st gear and the reverse gear R.Gg, a shifting device with a synchronizer S3 is provided. The associated idle gears 33, or respectively, 36 can be connected in a rotationally fixed manner to the transmission main shaft 7 by means of this synchromesh clutch S3 or in a neutral setting, depending on the setting. The 2nd gear can be shifted by means of the synchromesh clutch S2. The 3rd gear can be shifted by means of the synchromesh clutch S1.

A range gearing 4 designed as a planetary gear assembly is downstream of the two countershaft gearing groups 2 and 3. For this, an output side end of the transmission main shaft 7 is connected to a sun gear 41. A planetary gear set 43 is guided by a planet carrier 44 between the central sun gear 41 and an outer ring gear 42. The planet gears 43 mesh, on the one side with the sun gear 41 and on the other side with the outer ring gear 42. The planet carrier 44 is connected on the output side to a transmission output shaft 8.

For the purpose of shifting the range gearing 4, a shifting device 18, advantageously designed as a synchromesh clutch S4, is disposed. The synchromesh clutch S4 connects the ring gear 42 to a housing 35 in one shift setting, and in a second gear setting connects the ring gear 42 to the planet carrier 44, or respectively, to the transmission output shaft 8. In the first shift setting, the rotational speed ratio of the transmission output shaft 8 and the transmission main shaft 7 corresponds to the gear ratio of the planetary gear assembly, and in the second shift setting the range gearing 4 runs in an integral manner, in other words, converted directly.

The combination of the three gearing groups 2, 3, 4 gives 3×3×2=18 possible shift settings for the forward gears and 3×1×2=6 possible shift settings for the reverse gears, of which 17, in part power-shiftable, forward gears and 2 reverse gears can be used reasonably when driving.

The power flow of the individual gears and the power-shiftable gear shifting can be derived from the table in FIG. 2. In this table, in the columns C1 for the start-up clutch 11 and Syn 0, Syn 1, Syn 2, Syn 3, Syn 4 for the synchromesh clutches S0, S1, S2, S4, the associated shift settings of the constants K0, K1, K2, the gears 1.Gg, 2.Gg and the ranges L, H are marked with an "X" and the neutral settings are marked with an "0." With the range gearing 4 a distinction is made between a lower gear range L having the gears 1-9 and an upper gear range H having the gears 10-18. The non-power-shiftable gear shiftings are indicated in each case with a thicker line. It may be seen from the table that the gear shiftings "2.Gg-3.Gg," "5.Gg-6.Gg," "7.Gg-8.Gg," "11.Gg-12.Gg," "14.Gg-15.Gg," and "16.Gg-17.Gg" are tractive force supported for upshifting and downshifting. The 17th gear is the direct gear (DD). The 18th gear is designed as an overdrive (OD).

In the following, the method for executing a tractive force supported gear shifting with the described transmission 1, using as an example an upshifting to the direct gear shall be explained. The torque flow in the original gear, the torque flow during the overlapping under load and the torque flow in the target gear are highlighted by dots in FIGS. 3a-3c.

First, the transmission is in 16th gear. As can be seen in FIG. 3a, the start-up clutch is disengaged at this point and, accordingly, functionally bypassed. The input drive runs through the first input constant K0 when the synchromesh clutch S0 is engaged. The input drive runs through the third input constant K2 and continues directly to the output shaft 8 when the synchromesh clutch S1 is engaged.

For the shifting from 16th gear to 17th gear, or respectively, to the direct gear, the power-shift clutch 12, or respectively, the synchromesh clutch S0 of the upstream input constant K0 as well as the shifting device 15, or respectively, the synchromesh clutch S1 between the second input constant K1 and the third input constant K2 is disengaged, and while overlapping, the start-up clutch 11 is operated in slippage mode in terms of engagement until reaching rotational speed equilibrium between the transmission output shaft 8 and the drive shaft 5 (motor rotational speed) and then fully engaged. The torque flow branches thereby temporarily across both gears as illustrated in FIG. 3b, whereby the torque decreases over time in 16th gear and increases in 17th gear. The transmission input shaft 6 and the transmission main shaft 7 are connected to one another during this gear shifting by means of the associated shifting device 16 or respectively, the synchromesh clutch S2. The shifting device 17, or respectively, the synchromesh clutch S3 for shifting the 1st gear and the reverse gear of the main gearing 3 remain unaltered in the neutral setting. Furthermore, the transmission main shaft 7 is functionally connected to the transmission main shaft 8, whereby the ring gear 42 and the planet carrier 44 of the range gearing 4 are integrally meshed to one another, such that the range gearing 4 rotates at the rotational speed of the transmission main shaft 7, in other words, it is set in an upper gear range.

FIG. 3c illustrates the torque flow in the direct gear, or 17th gear. The input drive is transferred from the fully engaged start-up clutch 11 and the engaged synchromesh clutch S2 directly to the transmission main shaft 7 and by means of the range gearing, which is integrally connected by means of the synchromesh clutch S2, to the transmission output shaft 8.

FIG. 4 illustrates another countershaft transmission 1' with a clutch assembly 9'. Instead of the power-shift clutch 12 designed as a synchromesh clutch S0, with this embodiment a power-shift clutch designed as a friction clutch C2 is provided. The power-shift clutch 12' forms a double clutch with the start-up clutch 11 having a common input component 10' or respectively, with two single input components connected together. An output component 46 of the power-shift clutch 12' is connected by means of a hollow shaft 47 to an idle gear 21' of the first input constant K0. The rest of the assembly corresponds to the assembly of the transmission 1 described above.

FIG. 5 illustrates, finally, an associated gear pattern similar to that of FIG. 3, whereby the non-power-shiftable gear shiftings in turn are indicated by a thicker line in each case. It is apparent thereby that numerous three-part combinations of power-shiftable gears can be distinguished from one another by a non-power-shiftable gear shifting in each case. Tractive force supported gear shiftings with this transmission 1' can logically take place in an analogous manner to those exemplified for gear shiftings with transmission 1.

LIST OF REFERENCE SYMBOLS

1, 1' Countershaft transmission
2, 2' Gearing group, splitter gearing
3 Gearing group, main gearing
4 Gearing group, range gearing
5 Drive shaft 6 Transmission input shaft
7 Transmission main shaft
8 Transmission output shaft
9, 9' Clutch assembly
10, 10' Clutch input component
11 Start-up clutch
12 Power-shift clutch, synchromesh clutch S0
12' Power-shift clutch, friction clutch C2
13 Shift element
14 Shift element
15 Shifting device, synchromesh clutch S1
16 Shifting device, synchromesh clutch S2
17 Shifting device, synchromesh clutch S3
18 Shifting device, synchromesh clutch S4
19 Countershaft
20 Countershaft
21, 21' Idle gear
22 Fixed gear
23 Fixed gear
24 Idle gear
25 Fixed gear
26 Fixed gear
27 Idle gear
28 Fixed gear
29 Fixed gear
30 Idle gear
31 Fixed gear
32 Fixed gear
33 Idle gear
34 Fixed gear
35 Fixed gear
36 Idle gear
37 Fixed gear
38 Fixed gear
39 Intermediate gear
40 Intermediate gear
41 Sun gear
42 Ring gear
43 Planetary gear set
44 Planet gear carrier
45 Hollow shaft
46 Power-shift clutch output component
47 Hollow shaft
48 Start-up clutch output component
1.Gg Main gearing forward gear
2.Gg Main gearing forward gear
3.Gg Main gearing forward gear
R.Gg Main gearing forward gear
C1 Friction clutch
C2 Friction clutch
GPL/GPS Planetary gear assembly
K0 First splitter gearing input constant
K1 Second splitter gearing input constant
K2 Third splitter gearing input constant
S0 Synchromesh clutch
S1 Synchromesh clutch
S2 Synchromesh clutch
S3 Synchromesh clutch
S4 Synchromesh clutch

The invention claimed is:

1. An automated multi-group transmission of a motor vehicle, comprising:
a first gearing group and a second gearing group disposed successively in a power flow of a drive train;
a clutch assembly, having a start-up clutch, operable to establish a connection between a drive shaft of a drive motor and an input shaft associated with the first gearing group;
a first shifting device, operable to establish a connection between the input shaft and a main shaft associated with the second gearing group; and
a power-shift clutch, comprising a first shift element that is connected with an input component of the clutch assembly in a fixed manner,
wherein the first gearing group is a splitter gearing comprising a first input constant, on the motor side,
wherein the first shift element is operable to connect to the first input constant, bypassing the start-up clutch,
wherein the power-shift clutch is located between the first input constant and a second input constant of the first gearing group.

2. The multi-group transmission according to claim 1, wherein the power-shift clutch is designed as a synchromesh clutch.

3. The multi-group transmission according to claim 1, wherein the first shift element is connected to the input component through a hollow shaft; and
the first shift element is operable to connect to the first input constant by connecting to a second shift element, wherein the second shift element is connected to an idle gear of the first input constant and is rotationally mounted on the hollow shaft.

4. The multi-group transmission according to claim 1, wherein the power-shift clutch is a friction clutch.

5. The multi-group transmission according to claim 1, wherein the power-shift clutch is upstream of the first input constant.

6. The multi-group transmission according to claim 1, wherein the power-shift clutch and the start-up clutch are friction clutches, forming a double clutch with the input component connected together with the drive shaft, and
wherein an output component of the start-up clutch is connected to the input shaft and an output component of the power-shift clutch is connected to an idle gear of the first input constant rotationally mounted on the input shaft.

7. The multi-group transmission according to claim 1, wherein, in order to shift, a second and a third input constant of the splitter gearing as well as gear ratios of the second gearing group and a third gearing group are provided with synchromesh clutches.

8. The multi-group transmission according to claim 1, wherein the first gearing group, second gearing group, and a third gearing group are disposed successively in the power flow, and
wherein the first gearing group is an at least three-stage splitter gearing, the second gearing group is a multi-stage main gearing, and the third gearing group is a two-stage range gearing.

9. The multi-group transmission according to claim 8, wherein the at least three-stage splitter gearing and the multi-stage main gearing are countershaft gearings, and the two stage range gearing is a planetary gear assembly.

10. The multi-group transmission according to claim 1, wherein the main shaft is one of a transmission output shaft and a shaft functionally connected to a transmission output shaft.

11. The multi-group transmission according to claim 1, wherein the first gearing group is a splitter gearing with at least three input constants.

12. The multi-group transmission according to claim 3, wherein the hollow shaft is coaxial with the input shaft.

13. The multi-group transmission according to claim 1, wherein the input shaft is transmission input shaft.

14. An automated multi-group transmission of a motor vehicle, comprising:
- a first gearing group and a second gearing group disposed successively in a power flow of a drive train;
- a clutch assembly, having a start-up clutch, operable to establish a connection between a drive shaft of a drive motor and an input shaft associated with the first gearing group;
- a first shifting device, operable to establish a connection between the input shaft and a main shaft associated with the second gearing group; and
- a power-shift clutch, comprising a first shift element that is connected with an input component of the clutch assembly in a fixed manner,
- wherein the first gearing group is a splitter gearing comprising a first input constant, on the motor side,
- wherein the first shift element is operable to connect to the first input constant, bypassing the start-up clutch,
- wherein the first shift element is connected to the input component through a hollow shaft and the first shift element is operable to connect to the first input constant by connecting to a second shift element, wherein the second shift element is connected to an idle gear of the first input constant and is rotationally mounted on the hollow shaft.

15. A method for operating an automated multi-group transmission of a motor vehicle, comprising:
- establishing a connection, through a clutch assembly having at least one start-up clutch, between a drive shaft of a drive motor and an input shaft associated with a first gearing group;
- establishing a connection, through a first shifting device, between the input shaft and a main shaft associated with a second gearing group, and
- executing a tractive force supported gear shifting, wherein, in the tractive force supported gear shifting, depending on whether it is upshifting or downshifting, a start-up clutch is engaged or disengaged, while mutually overlapping with engagement or disengagement of a power-shift clutch,
- wherein the power-shift clutch is connected with the clutch assembly in a fixed manner, bypassing the start-up clutch, whereby a motor side input constant of the first gearing group is shifted, disengaged, or engaged, wherein the power-shift clutch is located between the first input constant and a second input constant of the first gearing group.

16. The method according to claim 15, wherein the executing a tractive force supported gear shifting further comprises:
- operating a transmission having a three-stage splitter gearing, a three-stage main gearing, and a two-stage range gearing;
- alternating the power-shift clutch for shifting the first input constant between a disengaged setting and an engaged setting;
- alternating the start-up clutch in a slippage mode between a disengaged setting and an engaged setting;
- alternating a second shifting device for shifting a second and a third input constant between a shifting setting and a neutral setting;
- maintaining a shifting setting of the first shifting device for establishing a connection of the input shaft with the main shaft;
- maintaining a shifting setting of a third shifting device for shifting a first gear and a reverse gear of the three-stage main gearing; and
- maintaining a shifting setting of a fourth shifting device for range change shifting of the two-stage range gearing.

17. The method according to claim 15, wherein for shifting a direct gear, the input shaft and the main shaft are directly connected to the drive shaft of the drive motor through the first shifting device and are also connected through the start-up clutch.

18. The method according to claim 15, wherein, for shifting non-direct forward gears, in each case a power flow connection between the drive shaft and the transmission main shaft is established, which runs over at least one countershaft.

19. The method according to claim 15, wherein the input shaft is a transmission input shaft and the main shaft is a transmission main shaft.

20. The method according to claim 15, wherein the main shaft is one of a transmission output shaft and a shaft functionally connected to a transmission output shaft.

* * * * *

UNITED STATES PATENT AND TRADEMARK OFFICE
CERTIFICATE OF CORRECTION

PATENT NO.       : 8,561,493 B2                                    Page 1 of 1
APPLICATION NO.  : 13/132870
DATED            : October 22, 2013
INVENTOR(S)      : Rayk Hoffmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 102 days.

Signed and Sealed this

Fifteenth Day of September, 2015

Michelle K. Lee
*Director of the United States Patent and Trademark Office*